US012094652B2

(12) United States Patent
Lee

(10) Patent No.: US 12,094,652 B2
(45) Date of Patent: Sep. 17, 2024

(54) HOLDING MAGNETIZER

(71) Applicant: Jae Yeol Lee, Seoul (KR)

(72) Inventor: Jae Yeol Lee, Seoul (KR)

( * ) Notice: Subject to any disclaimer, the term of this patent is extended or adjusted under 35 U.S.C. 154(b) by 312 days.

(21) Appl. No.: 17/641,870

(22) PCT Filed: Sep. 16, 2020

(86) PCT No.: PCT/KR2020/012492
§ 371 (c)(1),
(2) Date: Mar. 10, 2022

(87) PCT Pub. No.: WO2021/054717
PCT Pub. Date: Mar. 25, 2021

(65) Prior Publication Data

US 2022/0328227 A1 Oct. 13, 2022

(30) Foreign Application Priority Data

Sep. 20, 2019 (KR) ........................ 20-2019-0003868

(51) Int. Cl.
*H01F 7/20* (2006.01)

(52) U.S. Cl.
CPC .................................... *H01F 7/206* (2013.01)

(58) Field of Classification Search
CPC ..... H01F 7/206; B25B 23/0035; B25B 23/12; B25B 15/00
See application file for complete search history.

(56) References Cited

U.S. PATENT DOCUMENTS 5,724,873 A 3/1998 Hillinger
6,666,114 B1 12/2003 Lin

FOREIGN PATENT DOCUMENTS

| | | | | |
|---|---|---|---|---|
| JP | 2001071277 | A | | 3/2001 |
| JP | 2001310268 | A | * | 11/2001 |
| JP | 2010042486 | A | | 2/2010 |
| KR | 20-0203415 | | | 11/2000 |
| KR | 10-2001-0091778 | | | 10/2001 |
| KR | 20010091778 | A | * | 10/2001 |
| KR | 10-2005-0042366 | | | 5/2005 |
| KR | 100562708 | B1 | * | 3/2006 |
| KR | 10-1673154 | | | 11/2016 |
| KR | 10-1845502 | | | 4/2018 |
| KR | 20-0486120 | | | 4/2018 |

(Continued)

OTHER PUBLICATIONS

English Specification of 10-1673154.

(Continued)

*Primary Examiner* — Mohamad A Musleh
(74) *Attorney, Agent, or Firm* — ANTONIO HA & U.S. PATENT, LLC

(57) ABSTRACT

The present invention relates to a holding magnetizer, which can: maintain a strong magnetic force even if away from the tip of a driver bit, regardless of the length of the bit, when mounted on the bit so as to perform screw work; reduce or remove magnetic force when the magnetic force needs to be weakened in accordance with work circumstances; use a screw holding ability so as to prevent a screw from being separated from the bit and being lost; and remove iron powder, generated by screw abrasion during work, when the iron power is attached to the tip of the driver bit.

3 Claims, 6 Drawing Sheets

(56) References Cited

FOREIGN PATENT DOCUMENTS

| | | |
|---|---|---|
| KR | 10-2042747 | 11/2019 |
| WO | WO2005042210 A1 | 5/2005 |

OTHER PUBLICATIONS

English Specification of 20-0203415.
English Specification of 20-0486120.
English Specification of 10-2001-0091778.
English Specification of 10-1845502.
English Specification of 10-2005-0042366.
English Specification of JP2001071277A.
English Specification of JP2010042486A.
English Specification of 10-2042747.

* cited by examiner ( a )

( b )

HOLDING MAGNETIZER

TECHNICAL FIELD

The present invention relates to a holding magnetizer and, more specifically, to a holding magnetizer that may use all of a holding function, a magnetizing function, and a demagnetizing function depending on work circumstances when screwing is performed with a screwdriver with a screwdriver bit to thereby maximize the efficiency of various types of screwing work.

BACKGROUND ART

In general, screwdriver bits have a magnetized tip in light of work efficiency. However, as the magnetic force of such screwdriver bit weakens over time, the screw may easily escape off the screwdriver bit, troubling continuous work.

In other words, conventional screwdriver bits are hard to technically magnetize strong enough and, as time goes on, the magnetic force may disappear.

There have been developed magnetizers for magnetizing screwdriver bit, e.g., hexagon, star, ball, flat, or cross, with a strong magnetic force and holds a screw coming in various shapes, thereby enhancing work convenience.

However, conventional magnetizers are capable of simply generating a magnetic force at the tip of the screwdriver bit. Thus, if the magnetizer comes away from the tip of the screwdriver bit, the magnetic force may weaken.

In other words, when positioned closer to the screw, the magnetizer creates a magnetic force at the screwdriver bit, but the magnetizer may be pushed back by vibrations generated during work so that the magnetic force of the screwdriver bit may reduce, and it may fail to properly work.

To magnetize the screwdriver bit with a strong magnetic force, a ring-shaped neodymium permanent magnet may be used as a magnetizer. However, as a sufficient magnetic force is not provided with one such magnet, two or three magnets are used together. However, the permanent magnets may be broken by impacts during work. Further, the permanent magnets may be pushed back by the vibration from the power drill and attached to the adapter of the power drill. It is very burdensome to separate the permanent magnets, used as the magnetizer, from the power drill, and the adapter of the power drill may be broken.

Further, conventional magnetizers hold a screw only with magnetic force created at the tip of the screwdriver bit, so that it is difficult to work with one hand. For example, upon screwing on the ceiling, the worker grips the screwdriver or power drill with one hand and a screw with the other hand. This may be dangerous, and the screw may frequently come off the screwdriver bit, causing inconvenience in work and loss of the screw.

To address such issues, some conventionally available products hold a screw at the tip of the screwdriver bit. However, these products merely have a screw holding function and are inappropriate for various work circumstances, such as when it needs to be used with the magnetic body away from the tip of the screwdriver bit, e.g., screwing in a deep hole or a narrow gap.

Further, conventional magnetizers with a detachable magnetic body inserted thereto may conduct magnetic force to the screw but cannot drop it. Accordingly, such conventional magnetizers may not be used when it is needed to sometimes reduce the magnetic force at the screwdriver bit, e.g., to separate the screw to remove the screw metal shavings attached to the screwdriver bit or to perform work on electronic devices.

Prior technical documents in the art to which the present invention pertains include Korean Patent No. 10-1673154 and Korean Utility Model Registration No. 20-0203415.

DETAILED DESCRIPTION OF THE INVENTION

Technical Problems

The present invention has been conceived to address the foregoing issues with the prior art and aims to a holding magnetizer that may maintain a strong magnetic force even when coming away from the tip of the screwdriver bit regardless of the length of the screwdriver bit to give the capability of holding a screw, thereby preventing escape and loss of the screw during screwing work in various contexts, such as working on a deep hole or narrow gap or in a high position. Further, the holding magnetizer according to the present invention may reduce or eliminate the magnetic force in a work circumstance where a weak magnetic force is required.

Means to Address the Problems

According to the present invention, a holding magnetizer comprises a magnetic force conductance unit fitted over a bit and moving in two opposite directions, a first magnetizing unit disposed on a front side of the magnetic force conductance unit to give a magnetic force to the bit, and a second magnetizing unit disposed on a rear side of the magnetic force conductance unit to generate a repulsive force with the first magnetizing unit and giving a magnetic force to the bit.

The second magnetizing unit is larger than the first magnetizing unit and formed to have a larger magnetic force than the first magnetizing unit. A strong magnetic force is generated to the bit when the first magnetizing unit is positioned on a front side of the second magnetizing unit, and the magnetic force given to the bit is reduced when the first magnetizing unit is positioned on a rear side of the second magnetizing unit.

The first magnetizing unit is put in a burial recess formed in a front surface of the magnetic force conductance unit, and the second magnetizing unit is attached to a rear surface of the magnetic force conductance unit.

The holding magnetizer further comprises a controller including a main body member fitted over the outer surface of the bit and a cap member fitted on the bit. The main body member has an opening in one surface and includes a receiving space receiving the magnetic force conductance unit, the first magnetizing unit, and the second magnetizing unit, and the cap member opens and closes the opening of the main body member. The controller protects the first magnetizing unit and the second magnetizing unit and reciprocates along a lengthwise direction of the bit to facilitate attachment and detachment to/from the bit and separation from the bit.

Effects of the Invention

The holding magnetizer according to the present invention may maintain a strong magnetic force even when it comes away from the tip of the bit regardless of the length of the bit.

The holding magnetizer also has a holding function to fasten a screw to prevent escape off the bit and loss of the screw. The holding magnetizer may have a demagnetization function to reduce or eliminate magnetic force when a weak magnetic force is required in some work contexts.

In conventional magnetizers, only magnetic force is generated at the tip of the screwdriver bit and, if going away from the tip, the magnetic force reduces, rendering it difficult to properly work. However, the holding magnetizer according to the present invention may maintain a strong magnetic force regardless of the length of the screwdriver bit and provide a screw holding capability to strongly hold the screw up to the surface of the working object regardless of the depth of the working object or screwing in a narrow space. Thus, it is possible to prevent the screw from coming off to hurt the work or loss of the screw. Further, the holding magnetizer may be automatically moved back as soon as it contacts the surface of the working object to properly hold the screw until the work is finished. Further, the holding magnetizer according to the present invention may reduce or eliminate the magnetic force when a weak magnetic force is required in some work contexts. Further, it is possible to remove metallic shavings attached to the tip of the screwdriver bit as the screw is worn during work.

It is also possible to minimize costs and enhance productivity with a simplified configuration and reduced volume without the need for separately having a conventional magnetizer, screw holder, and demagnetizer while providing maximum effects required for work.

BEST MODE TO PRACTICE THE INVENTION

Figure 1:
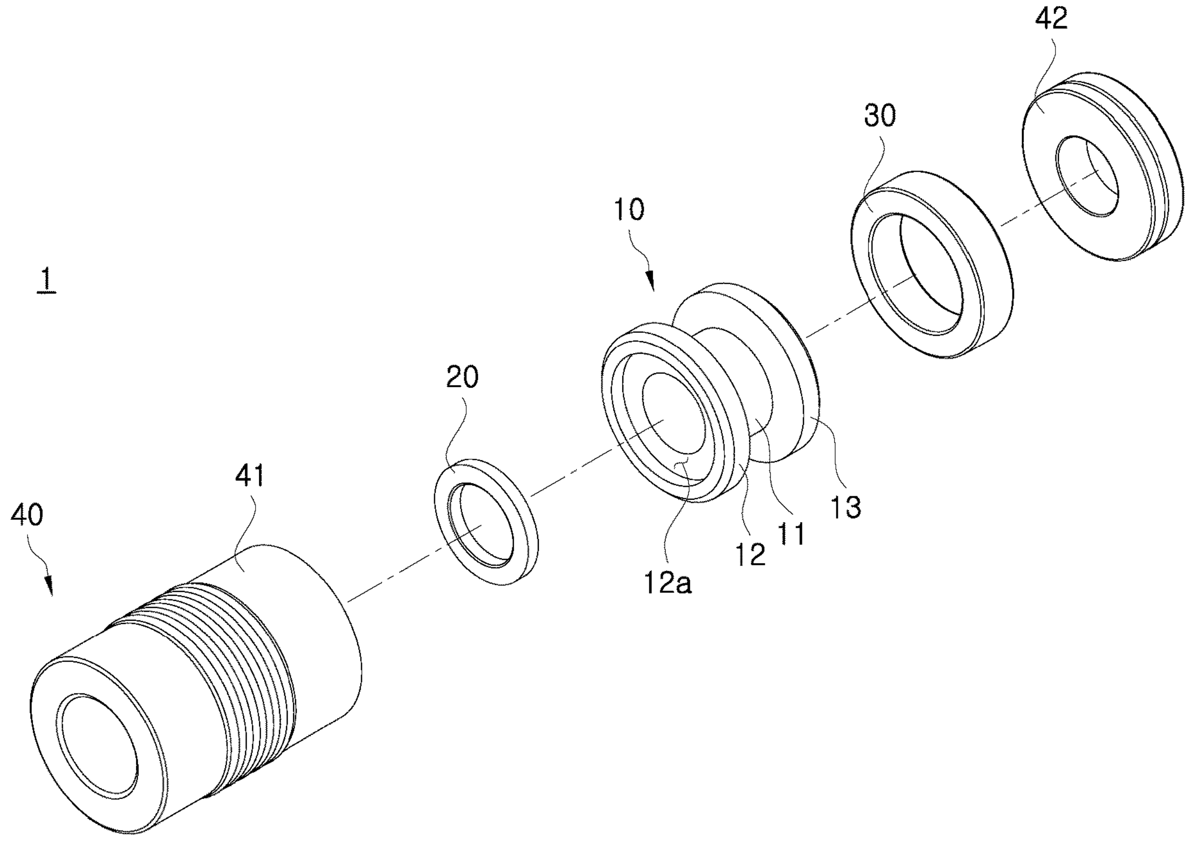
FIG. 1 is an exploded perspective view illustrating a holding magnetizer according to the present invention.

Advantages and features of the present invention, and methods for achieving the same may be apparent from the embodiments described below with reference to the accompanying drawings.

However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims. The same reference numeral denotes the same element throughout the specification.

Hereinafter, exemplary embodiments of the inventive concept will be described in detail with reference to the accompanying drawings. The inventive concept, however, may be modified in various different ways, and should not be construed as limited to the embodiments set forth herein. However, the present invention may be implemented in other various forms and is not limited to the embodiments set forth herein. Like reference denotations may be used to refer to the same or similar elements throughout the specification and the drawings.

Figure 2:
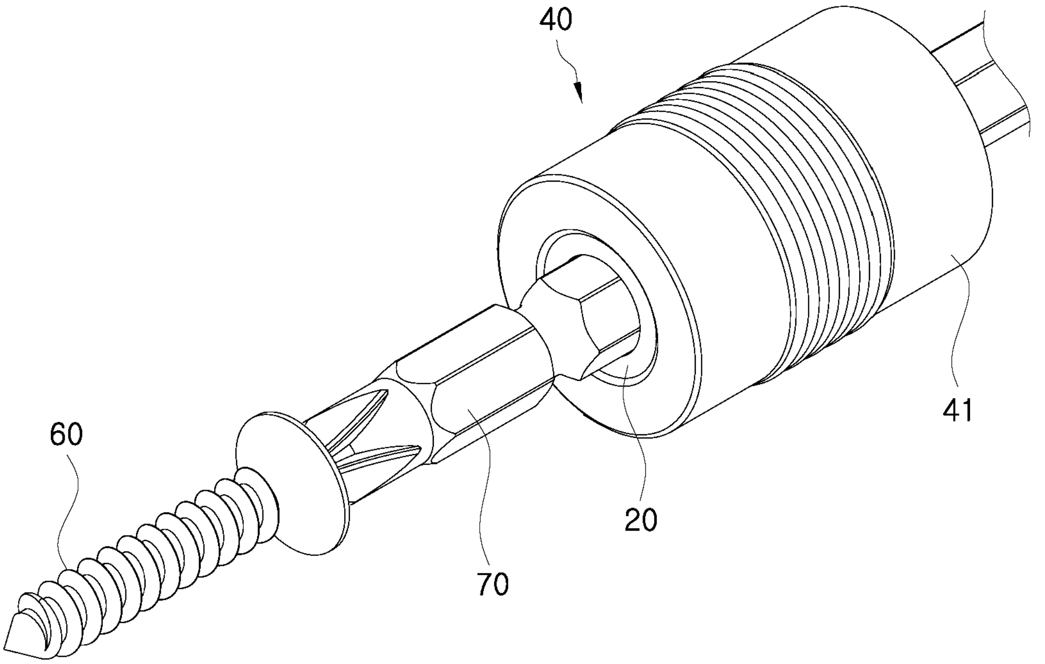
FIGS. 2 and 3 are perspective views illustrating a process in which a holding magnetizer is mounted to a screwdriver bit according to the present invention.
Figure 3:
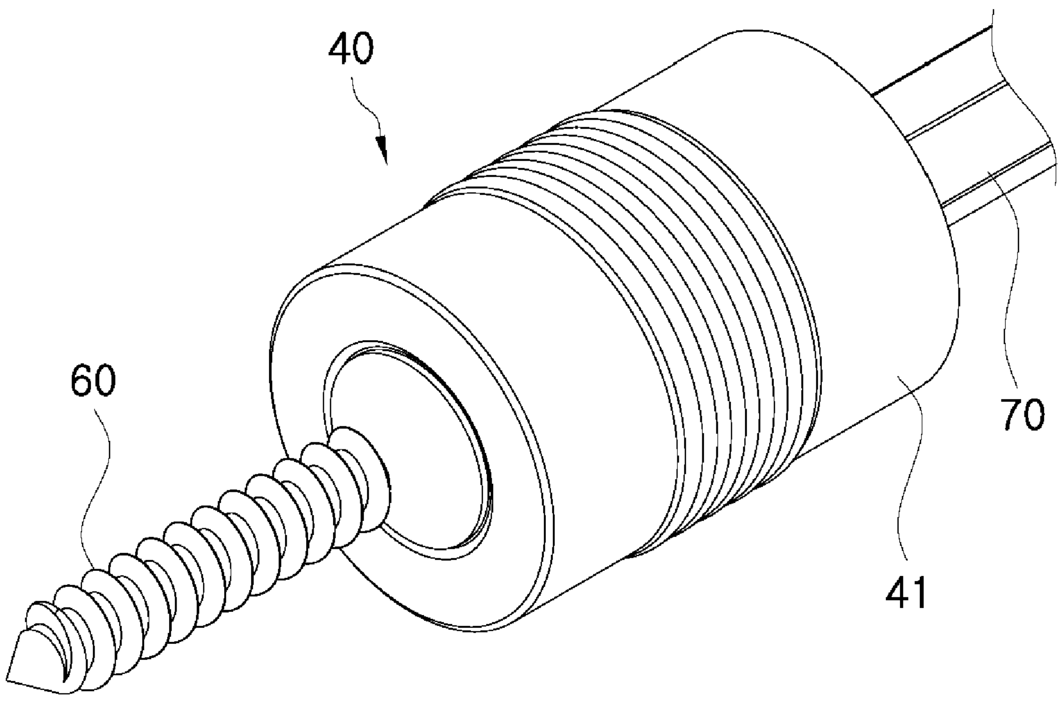
Figure 4:
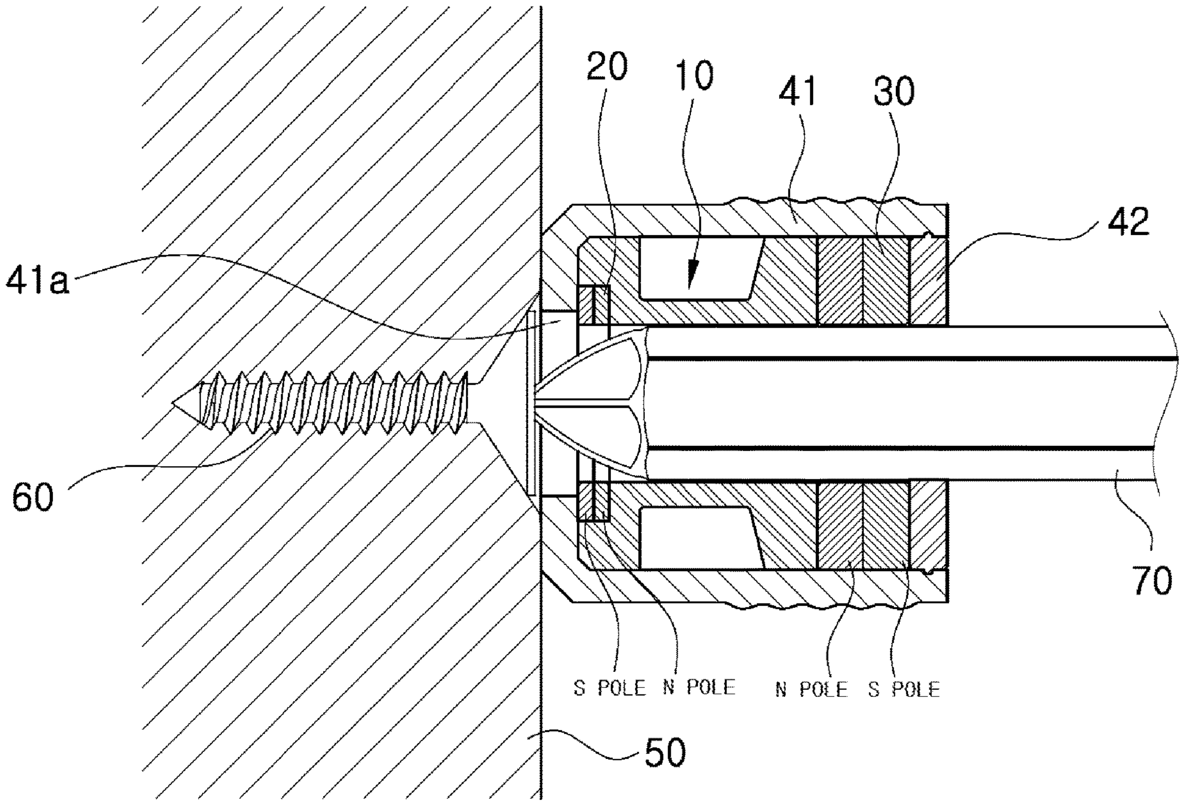
FIG. 4 is a cross-sectional view illustrating an example of use of a holding magnetizer according to the present invention.
Figure 5:
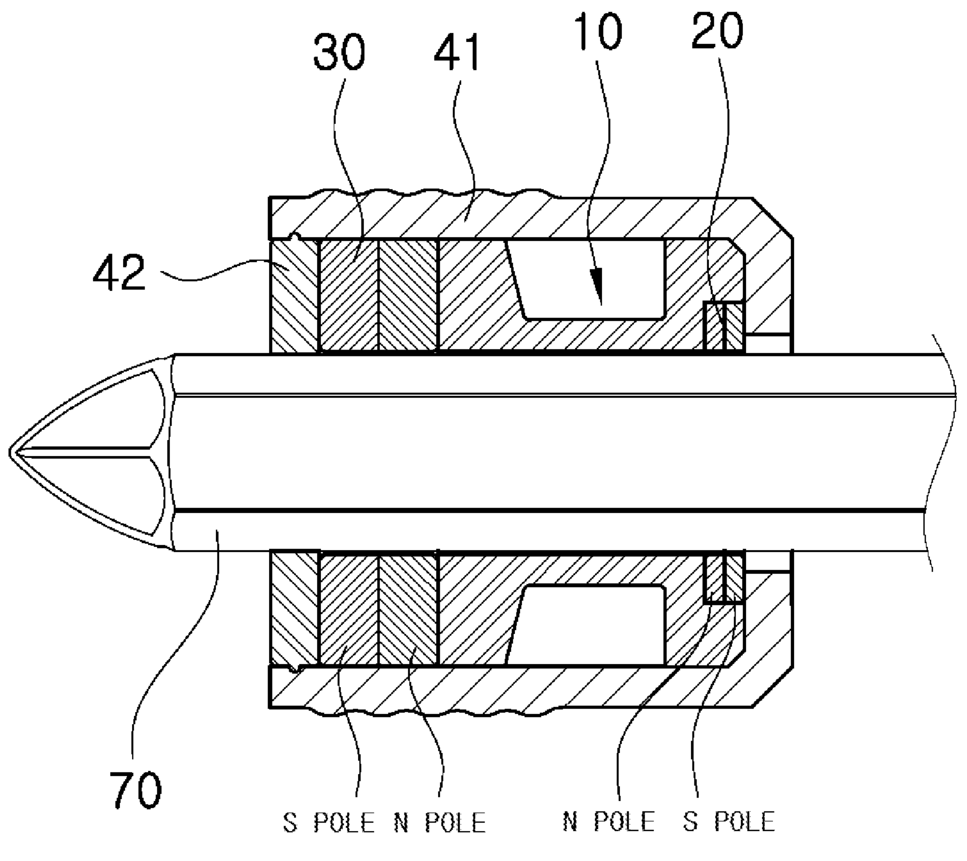
FIG. 5 is a cross-sectional view illustrating a state of reducing or eliminating a magnetic force by inverting a first magnetizing unit and a second magnetizing unit in a holding magnetizer according to the present invention.
Figure 6:
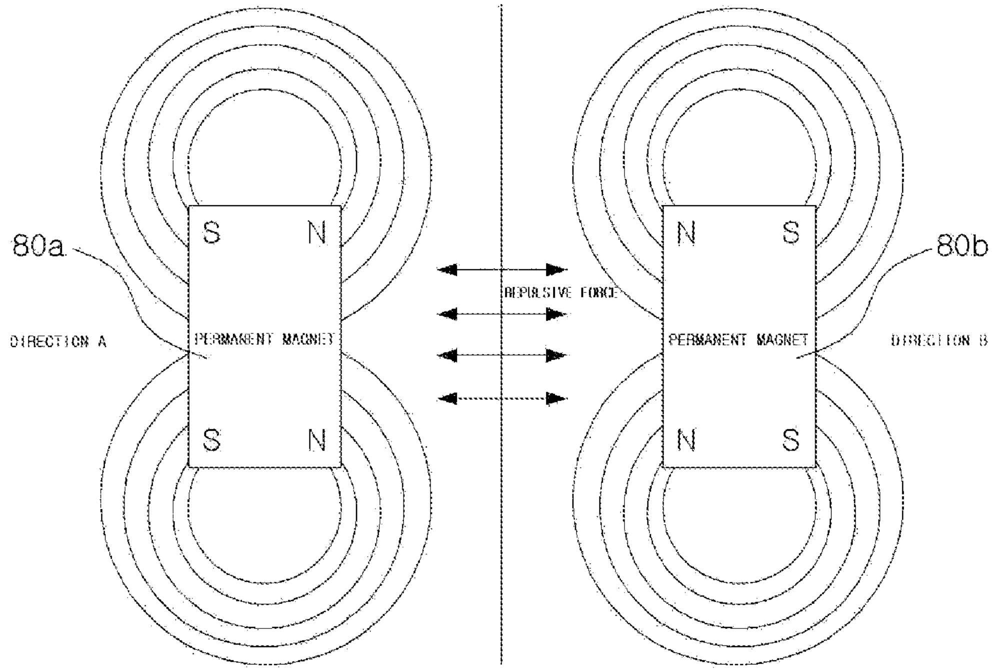
FIG. 6 is a view illustrating changes in magnetic field due to repulsive force of permanent magnets with different sizes applied to a holding magnetizer according to the present invention.
Figure 6:
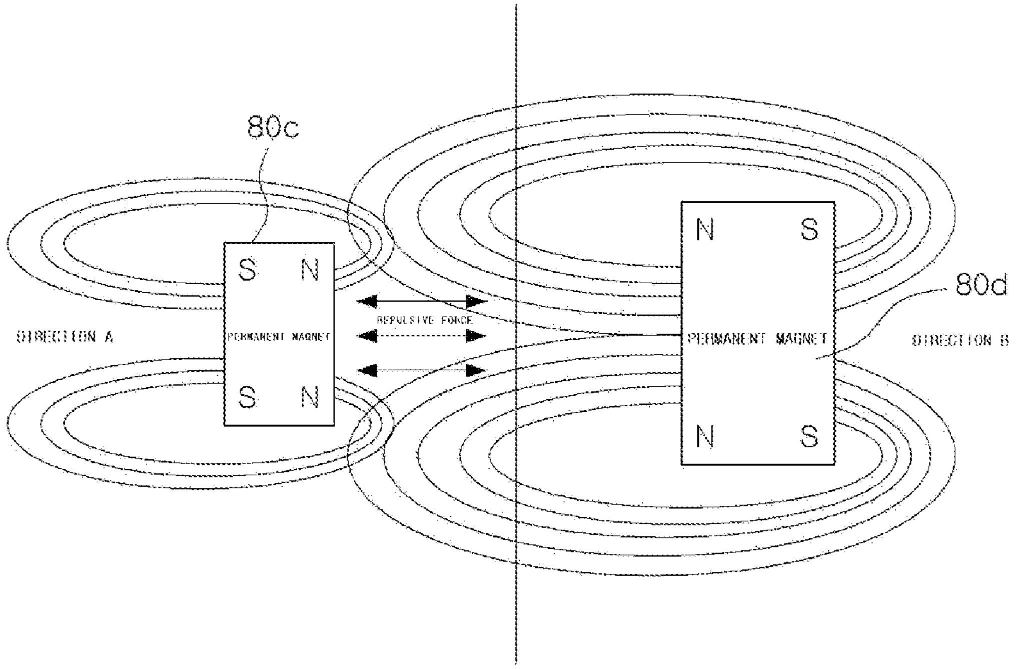

FIG. 1 is an exploded perspective view illustrating a holding magnetizer according to the present invention. FIGS. 2 and 3 are perspective views illustrating a process in which a holding magnetizer is mounted to a screwdriver bit according to the present invention. FIG. 4 is a cross-sectional view illustrating an example of use of a holding magnetizer according to the present invention. FIG. 5 is a cross-sectional view illustrating a state of reducing or eliminating a magnetic force by inverting a first magnetizing unit and a second magnetizing unit in a holding magnetizer according to the present invention. FIG. 6 is a view illustrating changes in magnetic field due to repulsive force of permanent magnets with different sizes applied to a holding magnetizer according to the present invention.

The present invention is a holding magnetizer 1 mounted on a drill bit or a screwdriver bit (hereinafter, a 'bit') for inserting a screw to a perforated object 50 to magnetize the bit and may include a magnetic force conductance unit 10 mounted on an outer surface of the bit, a first magnetizing unit 20 fixed to a front side of the magnetic force conductance unit 10 to give a magnetic force to the bit 70, a second magnetizing unit 30 fixed to a rear side of the magnetic force conductance unit 10 to give a magnetic force to the bit 70, and a controller 40 for protecting the magnetic force conductance unit 10, the first magnetizing unit 20, and the second magnetizing unit 30.

The holding magnetizer 1 according to the present invention, including such components, is mounted over the bit 70 and, regardless of the depth at which the bit 70 is inserted into the perforated object 50, holds a perforating member 60, e.g., a screw, up to the surface of the perforated object 50 and then is automatically moved back by the magnetic force. Thus, it is possible to allow the held perforating member 60 to be inserted into the perforated object 50 quickly and stably while checking the coupled state of the perforating member 60 with the naked eye at the moment of work.

Specifically, the magnetic force conductance unit 10 is formed as a hollow body to be mounted over the outer surface of the bit 70.

The magnetic force conductance unit 10 is formed of a metal to which a magnet can be attached. Further, the magnetic force conductance unit 10 may be formed in a block shape with a predetermined length and diameter and a circular cross section to reduce its weight and may increase the range of the magnetic force of the first magnetizing unit 20 and second magnetizing unit 30 given to the bit 70.

In this case, the magnetic force conductance unit 10 may include a center portion 11, a front portion 12, and a rear portion 13. The front portion 12 is formed on a front side of the center portion 11, has a larger diameter than the center portion 11, and includes a burial recess 12*a* in which the first magnetizing unit 20 is put and fixed. The rear portion 13 is formed on a rear side of the center portion 11 and has a larger diameter than the center portion 11. In this case, it is possible to enhance the productivity of assembly of the magnetic force conductance unit 10, the first magnetizing unit 20, and the second magnetizing unit 30.

The first magnetizing unit 20 and the second magnetizing unit 30 are components for magnetizing the bit 70, and each of the first magnetizing unit 20 and the second magnetizing unit 30 may be formed of a permanent magnet with S pole and N pole.

The first magnetizing unit 20 is formed in a ring shape and is fixed in the burial recess 12*a* of the front portion 12 to surround and magnetize the bit 70 when the magnetic force conductance unit 10 is mounted over the outer surface of the bit 70.

Of course, the inner diameter of the first magnetizing unit 20 is identical to the diameter of the hollow of the magnetic force conductance unit 10.

Unlike the first magnetizing unit 20, the second magnetizing unit 30 is attached to the rear portion 13 and is attached in a direction in which repulsive force is generated by interaction with the first magnetizing unit 20.

In other words, the first magnetizing unit 20 and the second magnetizing unit 30 may be fixed to the front portion 12 and the rear portion 13 so that the respective N or S poles of the first magnetizing unit 20 and the second magnetizing unit 30 face each other, generating strong magnetic force.

The drawings depict an example in which the respective N poles of the first magnetizing unit 20 and the second magnetizing unit 30 face each other.

The second magnetizing unit 30 is also formed in a ring shape and surrounds and magnetizes the bit 70 when the magnetic force conductance unit 10 is mounted over the outer surface of the bit 70.

Of course, the inner diameter of the second magnetizing unit 30 is identical to the diameter of the hollow of the magnetic force conductance unit 10.

As the magnetic force from the first magnetizing unit 20 and the second magnetizing unit 30 is conducted through the magnetic force conductance unit 10 to the bit 70 as described above, the range of magnetization or the strength of magnetic force given to the bit 70 increases.

Further, the second magnetizing unit 30 is formed to have a larger diameter and magnetic force than the first magnetizing unit 20.

The controller 40 protects the magnetic force conductance unit 10, the first magnetizing unit 20, and the second magnetizing unit 30. The controller 40 may allow the second magnetizing unit 30, which is attached to the magnetic force conductance unit 10 only by magnetic force, to remain in place on the magnetic force conductance unit 10 while easily moving in the lengthwise direction of the bit 70. The controller 40 also allows for easier separation of the second magnetizing unit 30 although the second magnetizing unit 30 is attached to the power drill by the vibration of the bit 70. The controller 40 may include a main body member 41 and a cap member 42.

In this case, the main body member 41 and the cap member 42 may be formed of plastic or aluminum.

The main body member 41 has an open rear space and a receiving space therein.

Accordingly, the second magnetizing unit 30 is attached to the magnetic force conductance unit 10 in which the first magnetizing unit 20 is placed and is then received in the receiving space, and the opening of the main body member 41 is closed by the cap member 42, protecting the magnetic force conductance unit 10, the first magnetizing unit 20, and the second magnetizing unit 30.

In this case, the cap member 42 may be press-fitted into the opening of the main body member 41.

Additionally, the front portion 12 of the magnetic force conductance unit 10 and the first magnetizing unit 20 come into contact with the front inner wall of the main body member 41, and the second magnetizing unit 30 is positioned inside the opening.

An exposure hole 41*a* is formed in the front surface of the main body member 41 to expose a predetermined area of the first magnetizing unit 20.

In this case, the exposure hole 41*a* may be formed so that its width gradually increases from an end facing the first magnetizing unit 20 to the opposite end. The exposure hole 41*a* allows the perforating member 60 to be attached to the first magnetizing unit 20.

Further, the exposure hole 41*a* also functions to surround and hold a tip of the perforating member 60.

Further, the cap member 42 has a hollow to allow it to fit over the outer surface of the bit 70.

In this case, the hollows of the cap member 42, magnetic force conductance unit 10, first magnetizing unit 20, and second magnetizing unit 30 are formed to have the same diameter. Accordingly, all of the cap member 42, the magnetic force conductance unit 10, the first magnetizing unit 20, and the second magnetizing unit 30 come in tight contact with the outer surface of the bit 70.

The above-described controller 40 reciprocates along the lengthwise direction of the bit 70, and the front surface of the main body member 41 contacts the perforated object 50 as shown in FIG. 4 so that it automatically moves back simultaneously with insertion of the perforating member 60 into the perforated object 50. Thus, the state of insertion of the perforating member 60 may be checked.

In other words, the controller 40 is positioned at a front side of the bit 70 and holds the perforating member 60 and then contacts the perforated object 50. Simultaneously, the controller 40 is automatically moved back by magnetic force. Thus, it is possible to immediately know that the perforating member 60 reaches the perforated object 50 and to allow for stable and quick finishing. Further, although the insertion depth of the perforated object 50 is large, the work may be finished with the same feature.

Further, in the case of using the magnetization function without using the holding function depending on the work context, such as when removing a screw inserted deep, the controller 40 is moved back in the lengthwise direction of the bit 70. In this case, a constant magnetic force may be transferred regardless of whether the controller 40 is positioned closer to the front side of the bit 70 in the lengthwise direction or is positioned at a rear side, i.e., regardless of the length of the bit 70 exposed.

Next, the operation and effects of a holding magnetizer according to the present invention are described.

In the holding magnetizer 1 according to the present invention, the first magnetizing unit 20 and the second magnetizing unit 30 are placed to generate repulsive force against each other. The second magnetizing unit 30 is formed to have a larger diameter and magnetic force than the first magnetizing unit 20. The first magnetizing unit 20 is positioned in front of the second magnetizing unit 30. The magnetic force conductance unit 10 is positioned between the first magnetizing unit 20 and the second magnetizing unit 30 so that the left tip of the bit 70 in the screwing direction sequentially passes through the second magnetizing unit 30, the magnetic force conductance unit 10, and the first magnetizing unit 20 to increase the strength of the magnetic force of the bit 70.

This magnetization method uses Coulomb's Law and the continuity equation and Lenz's Law, and this method is a magnetization method using the repulsive force and size of the permanent magnets.

Referring to (a) of FIG. 6, when two permanent magnets 80*a* and 80*b* in the same size are disposed to be spaced apart from each other with the same poles facing each other, a repulsive force is generated, and the magnetic fields are equally separated and are separately present only at each permanent magnet 80 so that magnetic force is generated only in the magnetic field range of each permanent magnet 80 without conductance of magnetic force to elsewhere while having no influence on the other spaces.

However, if a repulsive force is applied to two permanent magnets 80*c* and 80*d* having different sizes as shown in (b) of FIG. 6, the permanent magnet 80*d* having a larger magnetic force repels the permanent magnet 80*c* having a smaller magnetic force so that the magnetic field of the permanent magnet 80*c* extends in direction A.

In this case, the magnetic force conductance unit 10, which is formed of metal, is placed between the two permanent magnets 80*c* and 80*d* so that the two permanent magnets 80*c* and 80*d* are attached to the magnetic force conductance unit 10 by magnetic force and it is possible to maximally increase and maintain the magnetic force while keeping the maximum range of the magnetic field, generated by the two permanent magnets 80*c* and 80*d*, constant.

Further, if the permanent magnets 80*c* and 80*d* are moved, the magnetic field is moved. At this time, the continuity equation is applied to the magnetic field as the flow rate of water. Thus, the speed of the magnetic field when the magnetic field of the second magnetizing unit 30 continuously flows toward the first magnetizing unit 20 is inversely proportional to the cross sectional area of the permanent magnets 80*c* and 80*d* so that the speed of the magnetic field toward the first magnetizing unit 20 increases, and the density of magnetic field increases.

As a result, if the smaller permanent magnet 80*c* and the larger permanent magnet 80*d*, which are placed to generate repulsive force, together move toward the larger permanent magnet 80*d*, i.e., direction B, the magnetic field extends in direction A where the permanent magnet 80*c* is preset, by the repulsive force by which the larger permanent magnet 80*d* repels the smaller permanent magnet 80*c* while the continuity equation is simultaneously applied, so that the density of magnetic field increases in direction A and so does the strength of the magnetic force, and thus the magnetic field of the larger permanent magnet 80*d* moves in direction A.

Further, the magnetic field in direction B, which is opposite to the repulsive force of the larger permanent magnet 80*d*, is reduced. The so generated magnetics field are steadily maintained by the two permanent magnets 80*c* and 80*d*.

In other words, in a case where the present invention is implemented so that the smaller permanent magnet 80*c* is used as the first magnetizing unit 20, and the larger permanent magnet 80*d* is used as the second magnetizing unit 30, if the first magnetizing unit 20 is positioned on the left of the bit 70, and the second magnetizing unit 30 is positioned on the right as shown in FIG. 4, and the holding magnetizer 1 is moved from the left side of the bit 70 to the right, the strength of the magnetic field in the direction in which the left tip of the bit 70 faces may significantly increase so that the left tip of the bit 70 may be magnetized with strong magnetic force because, according to Lenz's law, small magnetic forces in the left tip of the bit 70 are aligned in the same direction to create a magnetic field that overlaps the magnetic field of the first magnetizing unit 20.

Accordingly, the so-created strong magnetic force is continuously maintained by the repulsive force between the first magnetizing unit 20 and the second magnetizing unit 30 having different sizes.

Thus, the holding magnetizer 1 according to the present invention may steadily maintain strong magnetic force regardless of the length of the bit 70 when performing screwing work using a variety of bits 70 on a manual driver or power drill, enhancing the screw holding function. Further, it is possible to provide the best work effect according to the work environment by eliminating the falling or loss of the screw due to coming off during work.

Further, as described above, when the first magnetizing unit 20 and the second magnetizing unit 30 are positioned on the left and right sides, respectively, of the bit 70, a strong magnetic force may remain at the entire bit 70. When the function of the controller 40 is not used, work may be performed, with the controller 40 shifted to the right of the bit 70.

Meanwhile, if the holding magnetizer 1 is moved to the right from the left tip of the bit 70 after mounting the bit 70 so that the second magnetizing unit 30 is positioned on the left of the bit 70 and the first magnetizing unit 20 is positioned on the right of the bit 70, the magnetic force remaining at the left tip of the bit 70 is moved to the right side of the bit 70 by the repulsive force between the second magnetizing unit 30 and the first magnetizing unit 20 so that the magnetic force at the left side of the bit 70 diminishes or disappears. In other words, when the left tip of the bit 70 is within the magnetic field range of the second magnetizing unit 30, the magnetic force remains and, as the left tip of the bit 70 comes away from the holding magnetizer 1, even the remaining magnetic force may be lost according to Coulomb's law by which magnetic force is inversely proportional to distance. Such state is continuously maintained by the repulsive force between the second magnetizing unit 30 and the first magnetizing unit 20.

In other words, in such a case, since the magnetized force of the bit 70 may be reduced or rendered to disappear, if screwing is conducted on an object, e.g., an electronic product, i.e., when magnetic force which is not too intense is desired for the bit 70, it may be useful.

Further, magnetic force remains at the bit 70 even when the bit 70 is removed from the holding magnetizer 1 after screwing is done. The metal shavings caused by wear to the screw when work is performed on the bit 70 may be attached to the tip of the bit 70, frequently deteriorating the fastening between the screw and the bit 70.

In such a case, if the cap member 42 is rendered to contact the bit 70 or come within a distance where repulsive force is created, the repulsive force is generated between the pole of the magnetic force generated at the bit 70 and the pole of the second magnetizing unit 30, irregularly dispersing the magnetic field aligned to the bit 70. At this time, the magnetic force which remains at the bit 70 is instantly canceled out, causing demagnetization. Thus, it is possible to easily remove the metal shavings from the tip of the bit 70.

It will be appreciated by one of ordinary skill in the art that the present disclosure may be implemented in other various specific forms without changing the essence or technical spirit of the present disclosure. Thus, it should be noted that the above-described embodiments are provided as examples and should not be interpreted as limiting. It should be noted that the scope of the present invention is defined by the appended claims rather than the described description of the embodiments and include all modifications or changes made to the claims or equivalents of the claims.

LEGEND OF REFERENCE NUMBERS

1: holding magnetizer
10: magnetic force conductance unit
11: center portion
12: front portion
12*a*: burial recess
13: rear portion
20: first magnetizing unit
30: second magnetizing unit
40: controller
41: main body member
41*a*: exposure hole
42: cap member
50: perforated object
60: perforating member
70: bit
80*a*, 80*b*, 80*c*, and 80*d*: permanent magnet

The invention claimed is:

1. A holding magnetizer, comprising:

a magnetic force conductance unit fitted over a bit and moving in two opposite directions;

a first magnetizing unit disposed on a front side of the magnetic force conductance unit to give a magnetic force to the bit; and a second magnetizing unit disposed on a rear side of the magnetic force conductance unit to generate a repulsive force with the first magnetizing unit and giving a magnetic force to the bit, wherein the second magnetizing unit is larger than the first magnetizing unit and formed to have a larger magnetic force than the first magnetizing unit, and wherein a strong magnetic force is generated to the bit when the first magnetizing unit is positioned on a front side of the second magnetizing unit, and the magnetic force given to the bit is reduced when the first magnetizing unit is positioned on a rear side of the second magnetizing unit.

2. A holding magnetizer, comprising:

a magnetic force conductance unit fitted over a bit and moving in two opposite directions;

a first magnetizing unit disposed on a front side of the magnetic force conductance unit to give a magnetic force to the bit; and a second magnetizing unit disposed on a rear side of the magnetic force conductance unit to generate a repulsive force with the first magnetizing unit and giving a magnetic force to the bit, wherein the first magnetizing unit is put in a burial recess formed in a front surface of the magnetic force conductance unit, and wherein the second magnetizing unit is attached to a rear surface of the magnetic force conductance unit.

3. A holding magnetizer, comprising:

a magnetic force conductance unit fitted over a bit and moving in two opposite directions;

a first magnetizing unit disposed on a front side of the magnetic force conductance unit to give a magnetic force to the bit;

a second magnetizing unit disposed on a rear side of the magnetic force conductance unit to generate a repulsive force with the first magnetizing unit and giving a magnetic force to the bit; and a controller including a main body member fitted over the outer surface of the bit and a cap member fitted on the bit and reciprocating along a lengthwise direction of the bit, wherein the main body member has an opening in one surface and includes a receiving space receiving the magnetic force conductance unit, the first magnetizing unit, and the second magnetizing unit, and wherein the cap member opens and closes the opening of the main body member.

* * * * *